US007123186B2

(12) United States Patent
Brabec et al.

(10) Patent No.: US 7,123,186 B2
(45) Date of Patent: Oct. 17, 2006

(54) CONTROLLING SOLUTION LATENCY IN A GLOBAL NAVIGATION SATELLITE RECEIVER

(75) Inventors: Vernon Joseph Brabec, Livermore, CA (US); Sergei B. Yudanov, Moscow (RU); Alexey Vladislavovich Zhdanov, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 285 days.

(21) Appl. No.: 10/810,293

(22) Filed: Mar. 26, 2004

(65) Prior Publication Data

US 2005/0212702 A1  Sep. 29, 2005

(51) Int. Cl.
*H04B 7/19* (2006.01)
(52) U.S. Cl. ...................................... 342/356
(58) Field of Classification Search ............... 342/356, 342/357.02, 357.09, 357.12; 701/213, 214, 701/215
See application file for complete search history.

(56) References Cited

U.S. PATENT DOCUMENTS

| 4,602,375 | A | * | 7/1986 | Inukai | 375/358 |
| 6,075,987 | A | * | 6/2000 | Camp et al. | 455/427 |
| 6,150,980 | A | | 11/2000 | Krasner | |
| 6,433,739 | B1 | | 8/2002 | Soliman | |
| 6,433,866 | B1 | | 8/2002 | Nichols | |
| 2005/0001742 | A1 | * | 1/2005 | Small | 340/988 |

OTHER PUBLICATIONS

U.S. Appl. No. 10/732,145, Ohtomo et al.

* cited by examiner

*Primary Examiner*—Dao L. Phan
(74) *Attorney, Agent, or Firm*—Law Office of Jeffrey M. Weinick, LLC

(57) ABSTRACT

A satellite positioning device is disclosed for determining position based on received satellite navigation signals and a received non-satellite signal. A local clock controls the epoch period of a satellite signal processor. Correction signals are applied to the local clock in order to improve the synchronization between the satellite signal processor and the non-satellite signal processor.

16 Claims, 4 Drawing Sheets

CONTROLLING SOLUTION LATENCY IN A GLOBAL NAVIGATION SATELLITE RECEIVER

BACKGROUND OF THE INVENTION

This invention relates generally to satellite navigation systems, and more particularly to controlling solution latency in a satellite navigation system.

Global Navigation Satellite Systems (GNSS) are well known and used to solve a wide variety of positioning/time related tasks. Two well known such systems are the Global Positioning System (GPS) of the United States and the GLObal NAvigation Satellite System (GLONASS) of Russia. This description will generally refer to the GPS system, but it is to be understood that the present description is equally applicable to GLONASS or other GNSS systems.

In recent years, there have been significant developments in the use of GPS receivers in the surveying and construction industries. In surveying applications, GPS is generally used to determine locations of points on the ground. GPS receivers are also being used for machine control in which the GPS position information is used to control construction machines. For example, GPS positioning information may be used to dynamically control a bulldozer blade. The use of GPS positioning in surveying and machine control provides many benefits, including responsiveness, reliability, autonomy, and all-weather operation.

The accuracy of GPS positioning has been improved by integrating other sources of positioning information with the GPS positioning receiver. These other sources provide additional positioning information which allows for a more accurate positioning solution. One example of such integration is in aviation, where it is common to integrate inertial sensors with GPS receivers. One reason for such integration is that inertial sensors have small short-term error and large long-term error, while GPS receivers have large short-term error and small long-term error. The integration of inertial sensors with GPS receivers provides a complement and allows a combined device to reduce both short-term and long-term errors. This improves the accuracy of positioning determination.

Typical examples of inertial sensors are accelerometers and gyros. Accelerometers measure acceleration and gyros measure angular rate. One typical integration technique is to provide an Inertial Measurement Unit (IMU) consisting of three accelerometers and three gyros. Sensors in each triad are orientated in mutually perpendicular directions. The sensor signals are digitized using an Analog to Digital Converter (ADC) and provided to the GPS receiver where they are combined with the GPS data.

An important requirement of an integrated IMU/GPS system is time synchronization of the GPS and IMU data. In other words, the data that is generated by each of the systems should have the same time reference point. Otherwise, the benefits of integrating the two systems will be reduced because there will be a reduction in accuracy of the ultimate positioning result obtained. In an IMU of the type described above, synchronization is generally accomplished as follows. The GPS receiver calculates position information at periodic time moments, referred to herein as epochs, which are defined by a local clock signal within the GPS receiver. The local clock signal is formed using a high quality quartz generator. The GPS receiver outputs this local clock signal to the IMU. The IMU outputs its data to the receiver in response to the local clock signal. The IMU and GPS are synchronized by controlling the timing of the IMU's data generation by the GPS clock signal.

There are sources of positioning and geometric information which are not so easily synchronized. For example, there exist devices which provide positioning/geometric information where the precise moment of data generation cannot be controlled via a GPS clock signal. One such device is a rotating laser system which may be used to determine additional positioning/geometric information. Such a system is described in detail in co-pending U.S. patent application Ser. No. 10/732,145 filed Dec. 10, 2003, entitled Working Position Measuring System. Such a rotating laser system generally includes a rotating laser at a fixed location, with a photodetector co-located with the GPS receiver. The photodetector periodically detects the rotating laser beam and generates a signal based upon receipt of the laser (i.e., when the laser beam strikes a photocell of the detector). The signal may be processed using various techniques in order to provide additional positioning/geometric information, such as the elevation angle between the photodetector and the transmitter. Knowledge of the elevation angle allows calculation of the height difference between transmitter and photodetector by multiplying the tangent of the angle and distance. Distance is calculated by the GPS receiver which is integrated in one housing with the laser detector. The accuracy of height estimation is improved because the elevation angle measurement is very precise within a small range. Such techniques are described fully in the above reference co-pending U.S. patent application Ser. No. 10/732,145. The details of such techniques are not important for the present discussion. What is important to recognize is that the data generation of the photodetector may not be synchronized with the GPS system by providing the GPS clock signal to the photodetector. The timing of the data generation of the photodetector is dependent upon the moment in time that the laser beam strikes the photocell of the photodetector. Such time is dependent upon the angular velocity of the rotating laser transmitter (and dependent upon dynamics (e.g., movement, if any) of the photodetector) and cannot be controlled by a clock signal received by the photodetector.

The above described synchronization problem results in a degradation of the position calculation. At the epoch moment when the GPS position calculation is made, the elevation angle data available from the photodetector is from some point in time prior to the epoch moment. The elevation angle is likely to have changed since this prior point in time, and thus the use of the old elevation angle data inserts error into the position calculation. Thus, stated another way, there is a latency between the time the elevation angle is calculated and the time when such elevation angle is actually used in conjunction with the GPS data to determine position. This solution latency results in reduced positioning accuracy.

One known solution to this problem is to extrapolate the elevation angle data to estimate the elevation angle at the epoch moment when the positioning determination is made. While this is an improvement over using the earlier calculated elevation angle, there is still a significant extrapolation error which reduces the accuracy of the position determination. In dynamic machine control applications, such as bulldozer blade control, such reduced accuracy has a significant effect on the overall effectiveness of the system.

While the solution latency problem has been described in connection with a rotating laser system which computes elevation angle, one of ordinary skill in the art will recognize that the latency problem exists anytime a non-satellite source of positioning information is integrated with a GPS system where the non-satellite source cannot be readily synchronized using a clock signal from the GPS receiver.

Thus, there exists a need to solve the solution latency problem described above.

BRIEF SUMMARY OF THE INVENTION

The present invention provides a method and apparatus for solving the solution latency problem.

In accordance with one embodiment of the invention, there is provided a method and apparatus for synchronizing a satellite positioning device having a local clock with a signal received from a non-satellite device. The local clock of the satellite positioning device controls the epoch periods of the device. A clock correction is calculated based at least in part upon the time of receipt of the non-satellite signal. The calculated clock correction is then applied to the local clock in order to better synchronize the epoch time and the time of receipt of the non-satellite signals. The clock correction may be calculated each time the non-satellite signal is received.

In one advantageous embodiment, the non-satellite signal is generated by a rotating laser transmitter.

These and other advantages of the invention will be apparent to those of ordinary skill in the art by reference to the following detailed description and the accompanying drawings.

DETAILED DESCRIPTION

Figure 1:
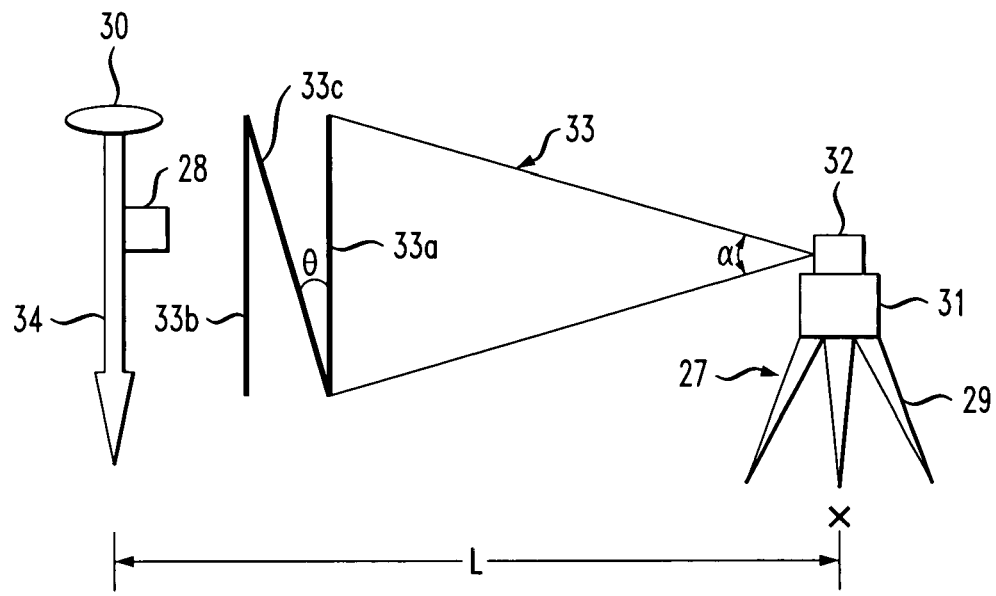
FIG. 1 shows a system in which the present invention has advantageous applicability.

One system in which the present invention has advantageous applicability is shown in FIG. 1. The system comprises a rotary laser device 27 for projecting a fan-shaped beam by rotary irradiation and a photodetection sensor device 28 for receiving the fan-shaped beam.

A tripod 29 is installed so that the tripod is approximately aligned with a known point X, and the rotary laser device 27 is mounted on the tripod 29. The rotary laser device 27 comprises a main unit 31 and a rotator 32 rotatably mounted on the main unit 31. A laser beam 33 is projected by rotary irradiation from the rotator 32. The photodetection sensor device 28 is supported by a predetermined supporting means. FIG. 1 shows how the device is operated in field operation. The photodetection sensor device 28 is installed on a rod 34, which can be manually carried by an operator. On an upper end of the rod 34, there is provided a GPS position measuring device 30. By using the GPS position measuring device 30, an absolute position on the ground can be measured based on a signal from a navigation satellite.

The laser beam 33 comprises a plurality of fan-shaped laser beams 33a and 33b in a vertical direction and a fan-shaped beam 33c tilted diagonally with respect to the fan-shaped beams 33a and 33b at an angle of θ, forming an N-shaped configuration. Also, the laser beams 33a and 33b are projected in a direction of ±δ with a spreading angle α respectively.

Figure 2:
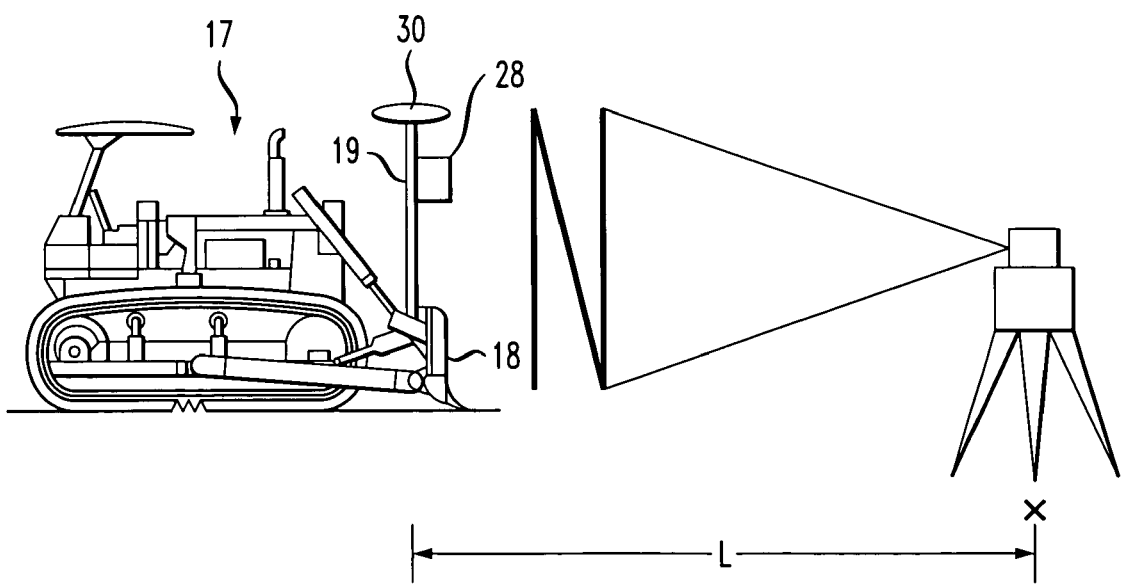
FIG. 2 shows another system in which the present invention has advantageous applicability.

Another system in which the present invention has advantageous applicability is shown in FIG. 2. In FIG. 2 the photodetector device 28 is fixed on a working tool of a construction machine (e.g., on a blade 18 of a bulldozer 17). A mounting pole 19 is erected on the blade 18, and the photodetection sensor device 28 is mounted on the mounting pole 19, and a GPS position measuring device 30 is installed at an upper end of the mounting pole 19. The bulldozer 17 comprises an excavation operation control unit (not shown) such as a computer to control the operation of the blade 19.

In both the systems of FIGS. 1 and 2, the photodetection sensor device comprises a photodetection unit for receiving the fan-shaped beams and an arithmetic unit for calculating an elevation angle relative to the rotary laser device based on photodetection signals produced when the photodetection unit receives the light beam. The elevation angle produced by the photodetection sensor device may be used in conjunction with the GPS position measuring device to increase the accuracy of the position determination task.

Further details of the functioning of a rotating laser system of the type described herein in conjunction with FIGS. 1 and 2 may be found in U.S. patent application Ser. No. 10/732,145, filed Dec. 10, 2003, entitled Working Position Measuring System, which is hereby incorporated by reference herein in its entirety. Such details will not be described in further detail herein as such details are not necessary for an understanding of the present invention.

As described above in the background of the invention, one of the problems presented when incorporating information from a non-satellite source of position/geometric information is the solution latency problem. This problem will now be described in further detail in conjunction with FIG. 3, which illustrates the synchronization problem discussed above.

Figure 3:
FIG. 3 illustrates a synchronization problem and shows two asynchronous time scales.

FIG. 3 shows two asynchronous time scales. The solid line signal pulses, e.g., signal pulse 102, represent the accurate equidistant signal pulses generated by the local clock of the GPS receiver. These are the pulses that define the epoch moments of the GPS receiver. The broken line signal pulses, e.g., signal pulse 104, represent the moments that the laser beam is detected by the photodetector device and the elevation angle is computed. These pulses are also referred to herein as event pulses. In FIG. 3, it is assumed that the period of the rotating laser is close to the period of the GPS local clock pulses. The delay (solution latency) is represented in FIG. 3 by 106, which represents the time delay from the calculation of the elevation angle (at time pulse 104) to GPS epoch moment 102. It is at time 102, when the GPS unit calculates the GPS position, that the elevation angle can be used to improve the position determination. However, at time 102 the elevation angle calculated at time 104 is an old measurement (delayed by interval 106). It is noted that due to the nature of the time scales, the delays (latencies) of a last event pulse relative to a current epoch pulse are continuously varying from 0 to the period of event pulses.

Figure 4:
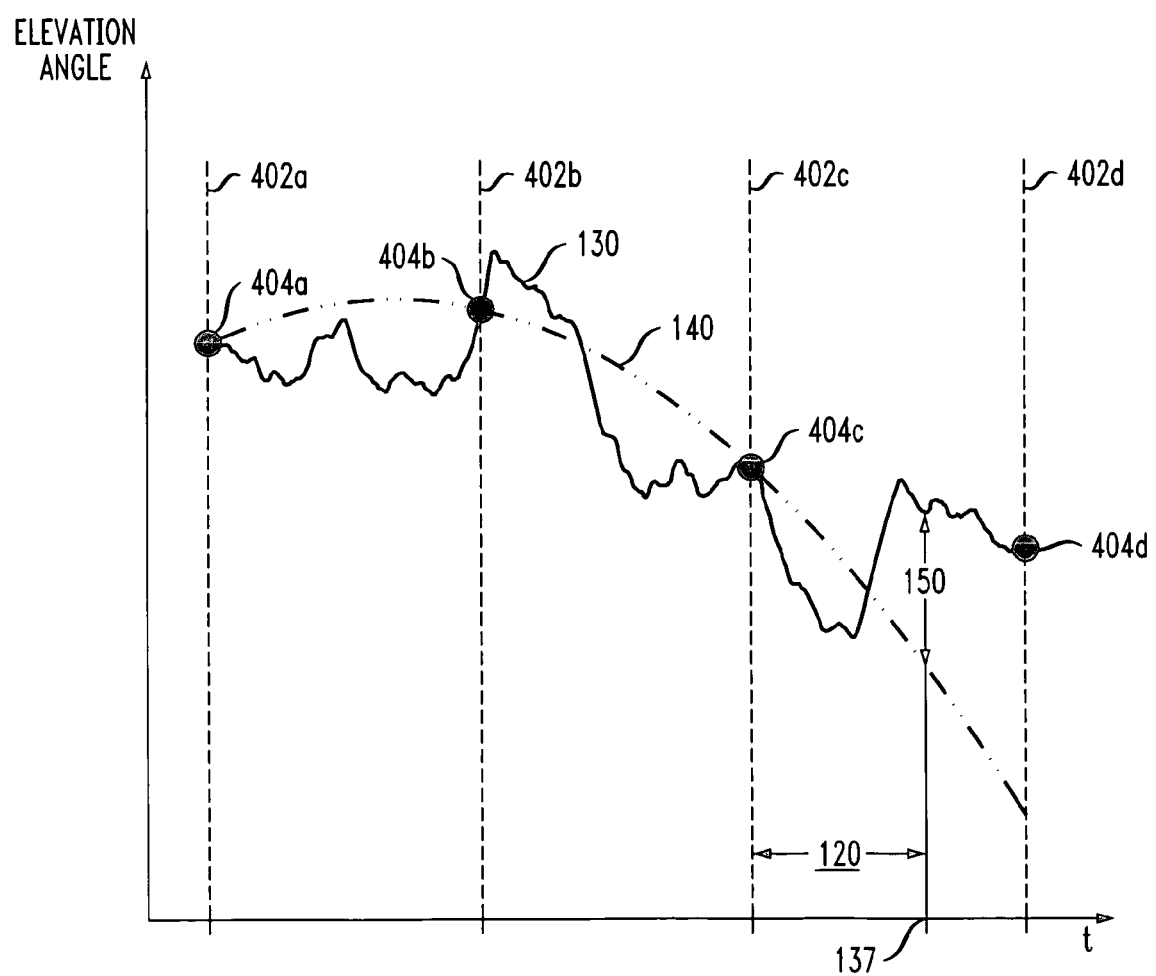
FIG. 4 illustrates extrapolation of an elevation angle.

In prior art systems, the latency problem is handled by extrapolation of the laser elevation angle to the current epoch moment. This extrapolation technique is illustrated in FIG. 4. In FIG. 4 line 130 represents the actual elevation angle over time of the mobile unit. The varying elevation angle may be the result, for example, of the photodetection device being mounted on construction equipment as shown in FIG. 2. Broken vertical lines 402a, 402b, 402c and 402d represent the event pulses (104 in FIG. 3) and are the times that the rotating laser beam strikes the photodetector device. Thus, accurate elevation angles are computed as follows. At event pulse 402a elevation angle 404a is computed, at event pulse 402b elevation angle 404b is computed, at event pulse 402c elevation angle 404c is computed, and at event pulse 402d elevation angle 404d is computed. Time 137 represents a GPS epoch moment, controlled by the local clock of the GPS unit, at which time a GPS position calculation is made. As discussed above, it is desirable to augment the GPS position calculation with the elevation angle information. However, at time 137 the most recent elevation angle information 404c was calculated at time 402c. There is a latency as represented by 120. One method of reducing the latency error is to extrapolate the elevation angle calculations to time 137. Such extrapolation requires a mathematical model of the change in elevation angle. A polynomial model is generally used for such extrapolation, as illustrated in FIG. 4 as the parabolic extrapolation 140 over the three points 404a, 404b and 404c. However, since the actual change in elevation angle is random, this algebraic model is not effective and extrapolation error 150 results. This extrapolation error decreases the effectiveness of the integration of the elevation angle data with GPS position data.

The present invention reduces the extrapolation error by better synchronizing the generation of the GPS position data with the generation of the elevation angle data.

Figure 5:
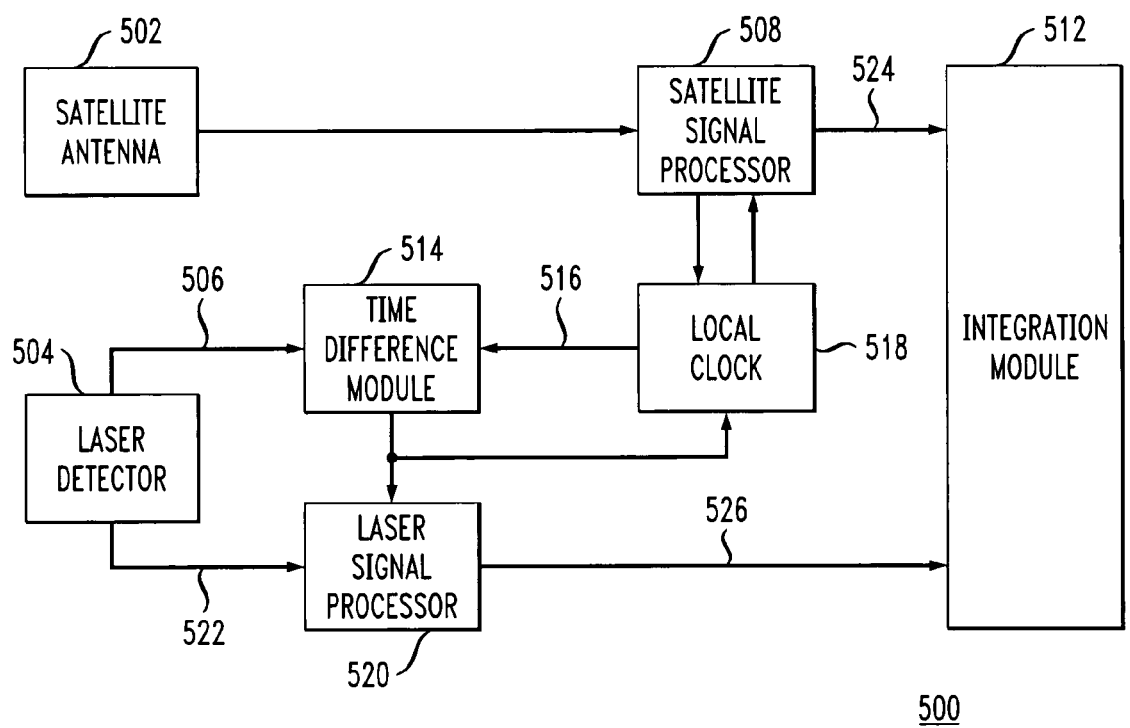
FIG. 5 shows a high level block diagram of a device configured in accordance with one embodiment of the invention.

FIG. 5 shows a high level block diagram of a device 500 configured in accordance with one embodiment of the invention. It is noted that this block diagram is meant to describe the high level functioning and configuration of device 500. One skilled in the art would readily recognize that some of the blocks represent hardware components while other blocks represent some function or operation. The functions and operations may be performed by hardware circuits, software instructions executing on a processor, firmware, or some combination of hardware and software. Given the description herein, those skilled in the art would be able to implement the described functionality using well known and various combinations of hardware and software. As such, implementation details of the functions described herein will not be described in detail as such implementation details would be readily known to one skilled in the art.

The device 500 comprises a satellite antenna 502 which receives satellite signals and provides the satellite signals to a satellite signal processor 508. The satellite signal processor 508 processes the satellite signals, calculates GPS position, and controls the local clock 518 as will be described in further detail below. The local clock 518 generates the epoch signal and local time which is used for processing the GPS signals in the satellite signal processor.

The device 500 also comprises a laser detector 504 which detects the rotating laser beam and provides signals representative of the received laser beam to a laser signal processor 520. The laser signal processor 520 processes the signal received from laser detector 504 in order to extrapolate an elevation angle as described above.

The laser detector 504 outputs an event signal 506 which, as described above, is the timing signal indicating the time at which the laser beam was received by the laser detector 504. This event signal 506 is provided to a time difference module 514. Time difference module 514 also receives the epoch signal 516 from local clock 518. The time difference module 514 calculates a clock correction based on the received signals and the clock correction is applied to the local clock 518 in order to better synchronize the GPS epoch signal and the laser detector event signal. This improved synchronization results in a reduced extrapolation error.

Further details of the operation of the apparatus shown in FIG. 5 will now be described with reference to the flow diagram of FIG. 6. One skilled in the art will recognize that the steps shown in FIG. 6 and described herein may be implemented using various hardware and software configurations. For example, in one embodiment, the steps may be performed by one or more processors executing computer program instructions.

Figure 6:
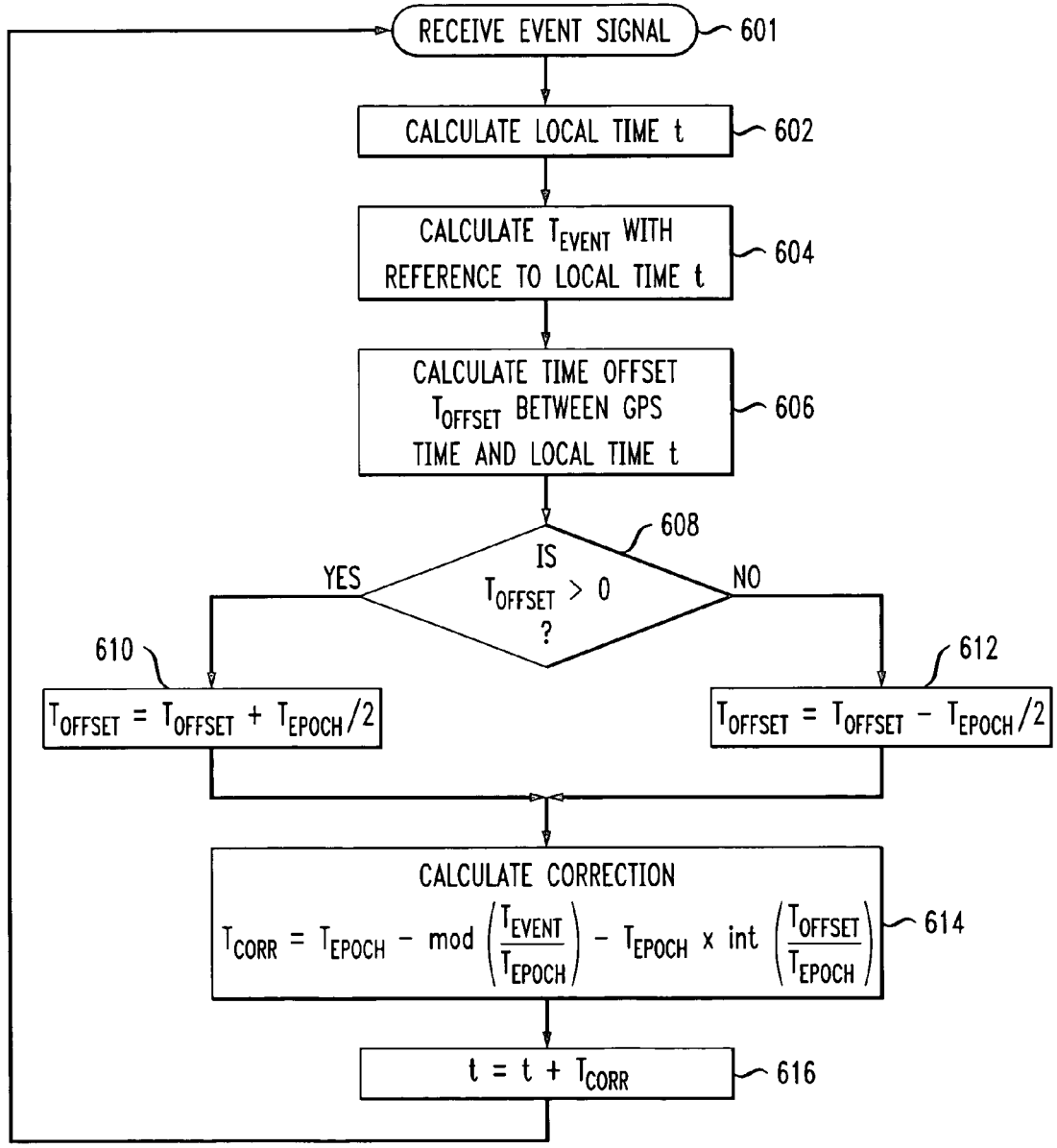
FIG. 6 is a flow diagram showing the steps performed during operation of the apparatus shown in FIG. 5.

The processing of the steps shown in FIG. 6 are initiated upon the receipt of an event signal from the laser detector 504 indicating that it has received the laser beam signal, as represented by 601. In step 602, the local time t is determined. The local clock 518 contains a local quartz oscillator that is used to keep track of local time based on counting. Next, in step 604, the time of the event signal, or event time ($T_{event}$) is determined with reference to local time t. In step 606 the offset ($T_{offset}$) between GPS time and local time t is calculated. GPS time is the time scale of the satellite system which is controlled by an atomic clock onboard the satellite. The offset between GPS time and local time is calculated as a result of processing the satellite signals in the satellite signal processor 508. This calculation is based on processing the pseudoranges from at least four satellites and is a well known GNSS technique.

Next, in step 608 it is determined whether the $T_{offset}$ calculated in step 606 is greater than zero. If it is, then in step 610 one half of an epoch period ($T_{epoch}$) is added to $T_{offset}$. If the $T_{offset}$ calculated in step 606 is not greater than zero, then one half of an epoch period ($T_{epoch}$) is subtracted from $T_{offset}$ in step 612. This technique of adding or subtracting one half of an epoch interval proves a zero mean value of time offset between GPS time and local clock time. After step 610 or 612, the local clock correction is calculated in step 614 by the following equation:

$$T_{corr} = T_{epoch} - \mathrm{mod}\left(\frac{T_{event}}{T_{epoch}}\right) - T_{epoch} \times \mathrm{int}\left(\frac{T_{offset}}{T_{epoch}}\right)$$

The correction $T_{corr}$ calculated in step 614 is applied to the local clock 518 to adjust the local time in step 616. The steps shown in FIG. 6 are repeated each time an event signal 506 is received from the laser detector 504 indicating that the laser detector 504 has received the laser beam signal. While other various embodiments are possible, in one embodiment of the invention, step 606 is performed by the satellite signal processor 508 and the remaining steps are performed by the time difference module 514 and the local clock 518.

The method described in conjunction with FIG. 6 results in the local clock 518 being adjusted so that the event time and the epoch time are more closely synchronized. As a result, the elevation angle data 522 provided from the laser detector 504 to the laser signal processor 520 is the elevation angle data of a time moment very close to the time moment that the satellite signal processor 508 calculates the GPS position. This results in a smaller extrapolation error in the calculation of the elevation angle by laser signal processor 520. The GPS position 524 and the elevation angle 526 are provided to the integration module 512. Since the GPS position and the elevation angle were substantially synchronously determined, the resulting position determination which uses both pieces of data is more accurate than in prior art solutions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, while the embodiments described above have generally been focused on an implementation in which the non-satellite signal being used to augment the GPS data is from a rotating N-shaped laser, the non-satellite signal may be any type of signal which may be used in combination with the GPS data to augment the position determination.

What is claimed is:

1. A method for synchronizing a satellite positioning device having a local clock defining an epoch period with a laser beam signal comprising the steps of:
   a) receiving said laser beam signal at a first time;
   b) calculating a clock correction based at least in part on said first time;
   c) applying said clock correction to the local clock of the satellite positioning device.

2. The method of claim 1 wherein said steps a)–c) are repeated each time said laser beam signal is received.

3. The method of claim 1 wherein said step of calculating a clock correction further comprises the steps of:
   determining a local time t based on said local clock;
   determining a time $T_{event}$ as said first time with reference to local time t;
   determining a time offset $T_{offset}$ as between satellite time and local time t;
   adding one half of an epoch period to $T_{offset}$ if $T_{offset}$ is greater than 0;
   subtracting one half of an epoch period from $T_{offset}$ if $T_{offset}$ is not greater than 0;
   calculating a clock correction $T_{corr}$ as $$T_{corr} = T_{epoch} - \mod\left(\frac{T_{event}}{T_{epoch}}\right) - T_{epoch} \times \mathrm{int}\left(\frac{T_{offset}}{T_{epoch}}\right);$$

and
   applying said clock correction $T_{corr}$ to said local clock.

4. The method of claim 1 wherein said laser beam signal is generated by a rotating laser transmitter.

5. The method of claim 4 wherein the period of said rotating laser transmitter is substantially equal to said epoch period.

6. The method of claim 4 wherein said laser beam has an N shape.

7. A satellite positioning device comprising:
   a local clock;
   a satellite signal processor for processing satellite signals and generating position information, whereby timing epochs of said processing are based on said local clock;
   a laser signal processor for processing received laser beam signals; and
   a time difference module for generating a clock correction signal based at least in part on the time of receipt of said laser beam signals.

8. The satellite positioning device of claim 7 further comprising a laser detector connected to said laser signal processor.

9. The satellite positioning device of claim 7 wherein said time difference module is configured to generate a clock correction signal by performing the steps of:
   determining a local time t based on said local clock;
   determining a time $T_{event}$ as the time of receipt of a laser beam signal with reference to local time t;
   determining a time offset $T_{offset}$ as between satellite time and local time t;
   adding one half of an epoch period to $T_{offset}$ if $T_{offset}$ is greater than 0;
   subtracting one half of an epoch period from $T_{offset}$ if $T_{offset}$ is not greater than 0;
   calculating a clock correction $T_{corr}$ as $$T_{corr} = T_{epoch} - \mod\left(\frac{T_{event}}{T_{epoch}}\right) - T_{epoch} \times \mathrm{int}\left(\frac{T_{offset}}{T_{epoch}}\right).$$

10. A method for use in a satellite positioning device which generates final position information based on received satellite signals and at least one received non-satellite signal, said method comprising the steps of:
   periodically calculating satellite position information at each of a plurality of epochs, said epochs defined by a local clock;
   periodically calculating non-satellite position information based on said non-satellite signal at each of a plurality of event times, said event times defined by time of receipt of said non-satellite signals;
   periodically calculating final position information based on said satellite position information and said non-satellite position information; and
   applying clock corrections to said local clock to improve the synchronization of said epochs and said event times.

11. The method of claim 10 wherein said non-satellite signal is a laser signal received from a rotating laser transmitter.

12. The method of claim 10 wherein said clock corrections are based at least in part on said event times.

13. The method of claim 10 further comprising the steps of:
   determining a local time t based on said local clock;
   determining a time $T_{event}$ as an event time with reference to local time t;
   determining a time offset $T_{offset}$ as between satellite time and local time t;
   adding one half of an epoch period to $T_{offset}$ if $T_{offset}$ is greater than 0;
   subtracting one half of an epoch period from $T_{offset}$ if $T_{offset}$ is not greater than 0; and
   calculating a clock correction $T_{corr}$ as $$T_{corr} = T_{epoch} - \mod\left(\frac{T_{event}}{T_{epoch}}\right) - T_{epoch} \times \mathrm{int}\left(\frac{T_{offset}}{T_{epoch}}\right).$$

14. A satellite positioning device comprising:
   a local clock defining an epoch period;
   means for receiving a laser beam signal generated by a rotating laser transmitter at a first time;
   means for calculating a clock correction based at least in part on said first time; and means for applying said clock correction to the local clock.

15. The satellite positioning device of claim 14 wherein said means for calculating a clock correction further comprises:
means for determining a local time t based on said local clock;
means for determining a time $T_{event}$ as said first time with reference to local time t;
means for determining a time offset $T_{offset}$ as between satellite time and local time t;
means for adding one half of an epoch period to $T_{offset}$ if $T_{offset}$ is greater than 0;
means for subtracting one half of an epoch period from $T_{offset}$ if $T_{offset}$ is not greater than 0;
means for calculating a clock correction $T_{corr}$ as $$T_{corr} = T_{epoch} - \mod\left(\frac{T_{event}}{T_{epoch}}\right) - T_{epoch} \times \text{int}\left(\frac{T_{offset}}{T_{epoch}}\right);$$

16. The satellite positioning device of claim 14 wherein said laser beam has an N shape.

* * * * *